J. J. GRANT.
NUT MACHINE.
APPLICATION FILED OCT. 17, 1913.

1,127,754.

Patented Feb. 9, 1915.
11 SHEETS—SHEET 1.

Witnesses
Chas. W. Stauffiger
A. M. Shannon.

Inventor
John J. Grant,
By Barthel & Barthel
Attorneys

J. J. GRANT.
NUT MACHINE.
APPLICATION FILED OCT. 17, 1913.

1,127,754.

Patented Feb. 9, 1915.
11 SHEETS—SHEET 3.

Witnesses
Chas. W. Stauffiger
O. M. Shannon.

Inventor
John J. Grant,
By
Attorneys

J. J. GRANT.
NUT MACHINE.
APPLICATION FILED OCT. 17, 1913.

1,127,754.

Patented Feb. 9, 1915.
11 SHEETS—SHEET 5.

Witnesses
Chas. W. Stauffiger
O. M. Shannon

Inventor
John J. Grant,
By
Barthof &c
Attorneys

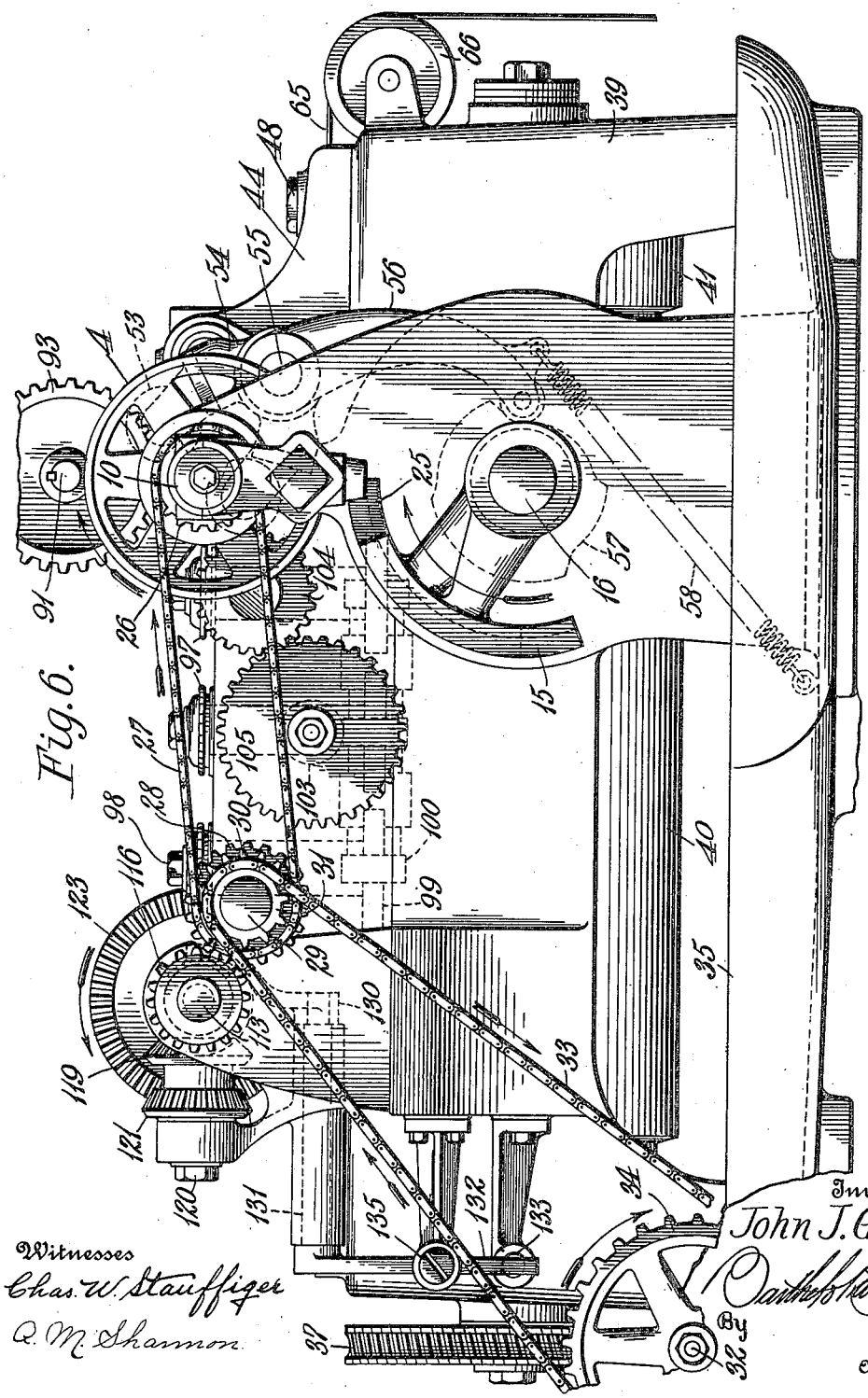

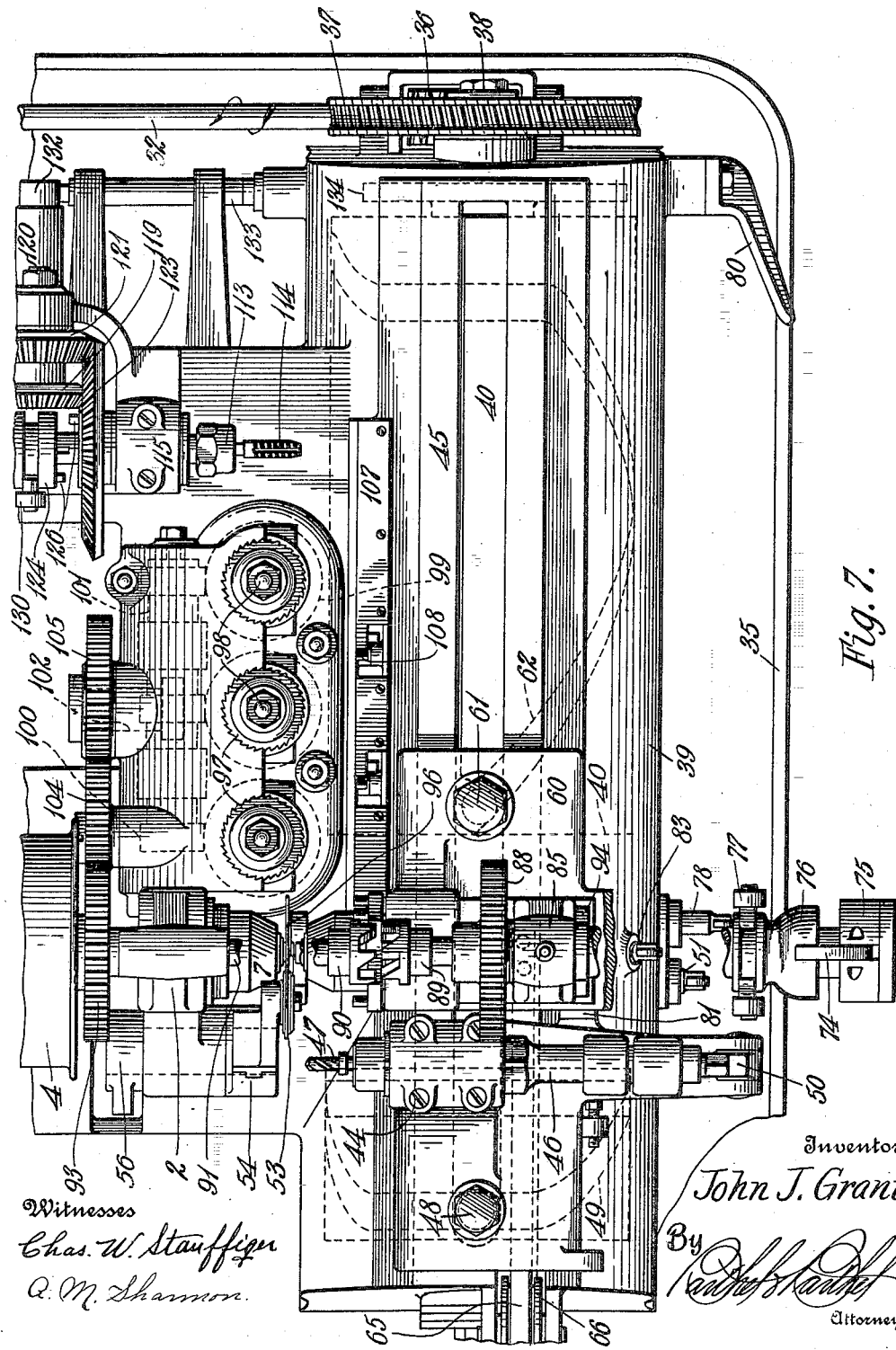

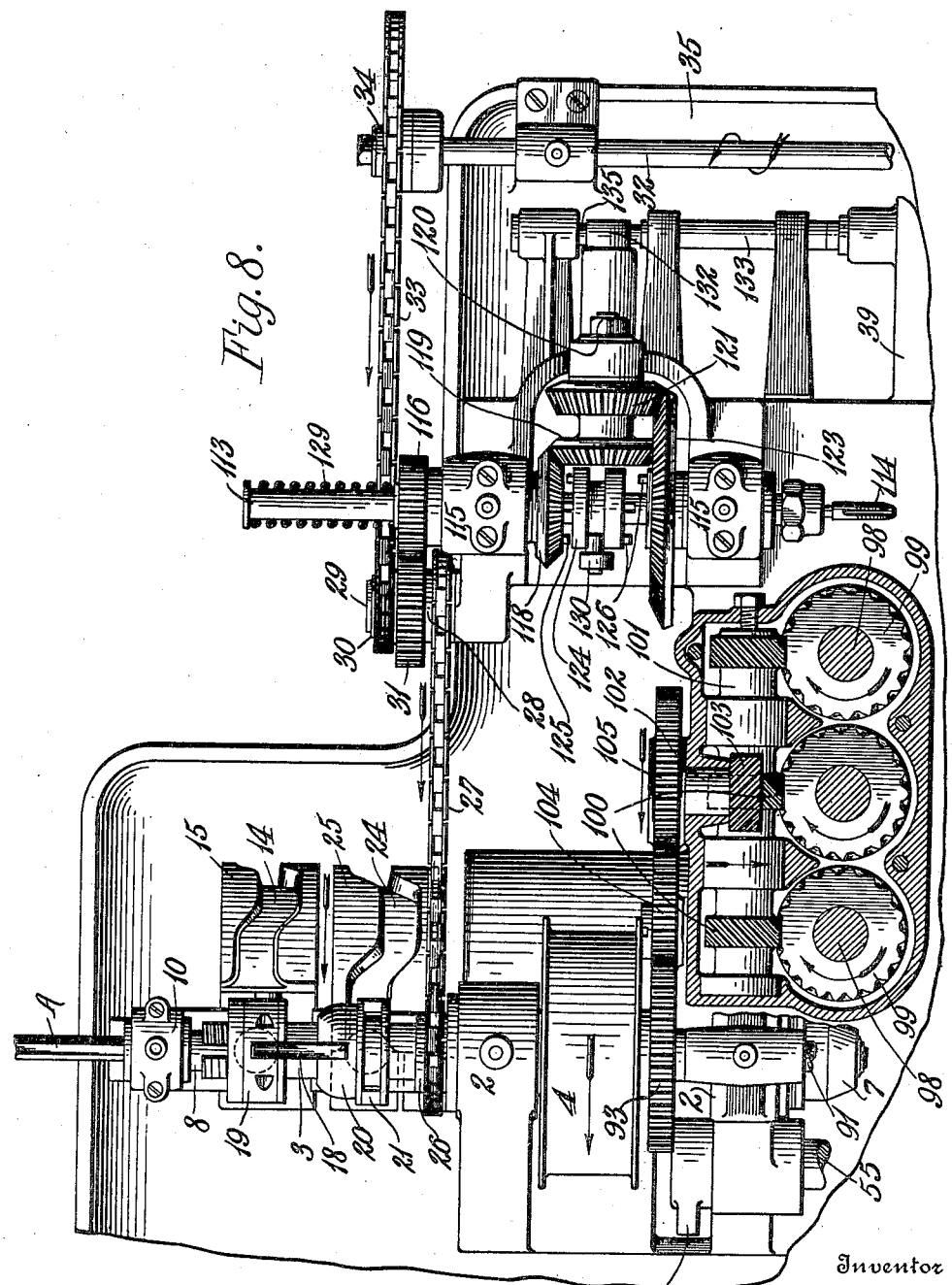

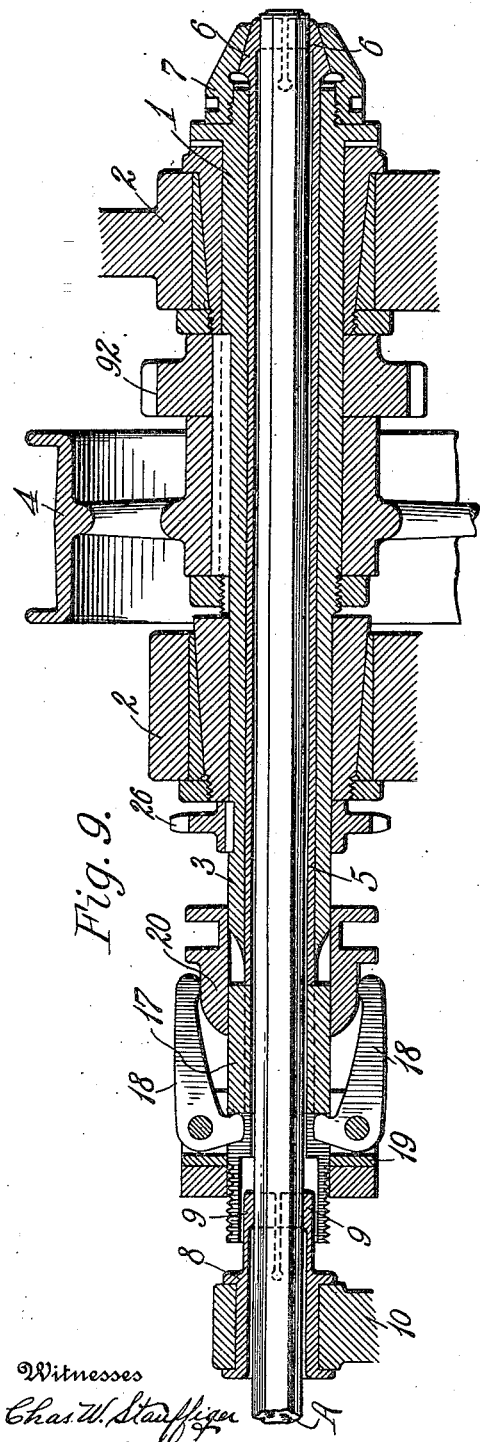
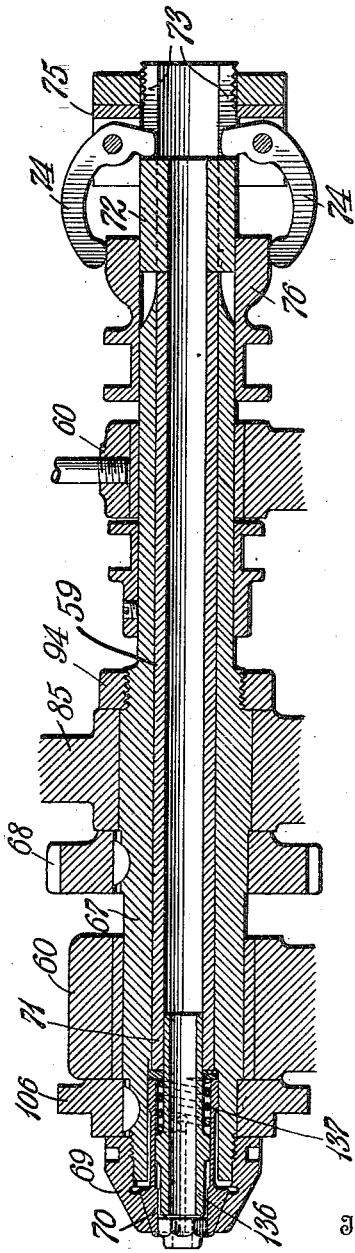

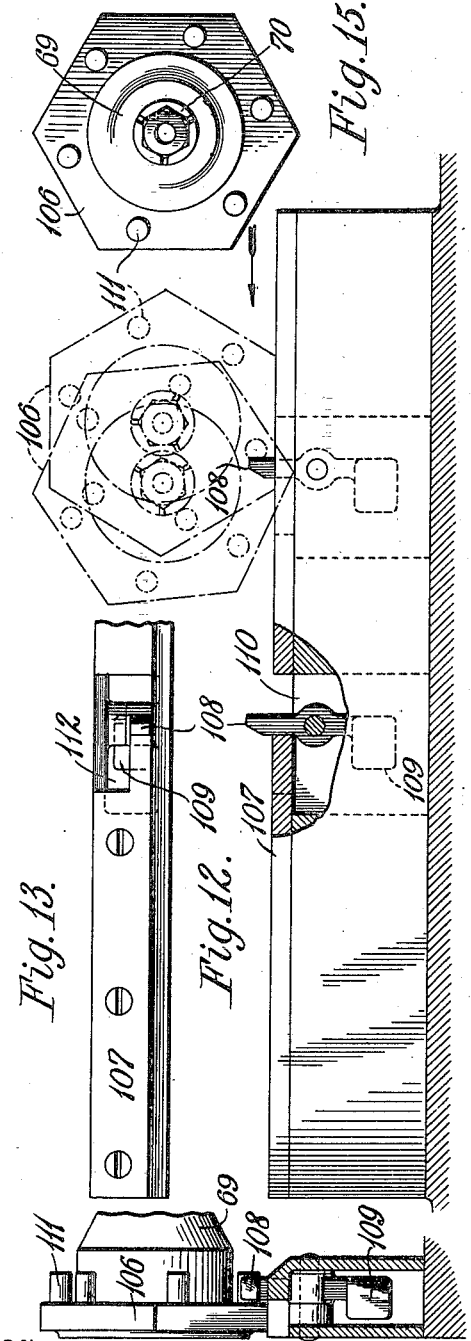

UNITED STATES PATENT OFFICE.

JOHN J. GRANT, OF PONTIAC, MICHIGAN.

NUT-MACHINE.

1,127,754.  Specification of Letters Patent.  Patented Feb. 9, 1915.

Application filed October 17, 1913. Serial No. 795,804.

*To all whom it may concern:*

Be it known that I, JOHN J. GRANT, a citizen of the United States of America, residing at Pontiac, in the county of Oakland and State of Michigan, have invented certain new and useful Improvements in Nut-Machines, of which the following is a specification, reference being had therein to the accompanying drawings.

This invention relates to a machine for automatically forming castellated nuts and its object is to provide a machine which will operate to feed a metal bar, form and cut blanks from said bar, castellate and tap the same, and discharge the finished nuts, all in a continuous automatic operation of the machine.

A further object is to secure simplicity and compactness of construction and accuracy of operation, and to provide certain other new and useful features.

To these ends the invention consists in the matters hereinafter more fully set forth and pointed out in the appended claims, reference being had to the accompanying drawings in which—

Figure 1:
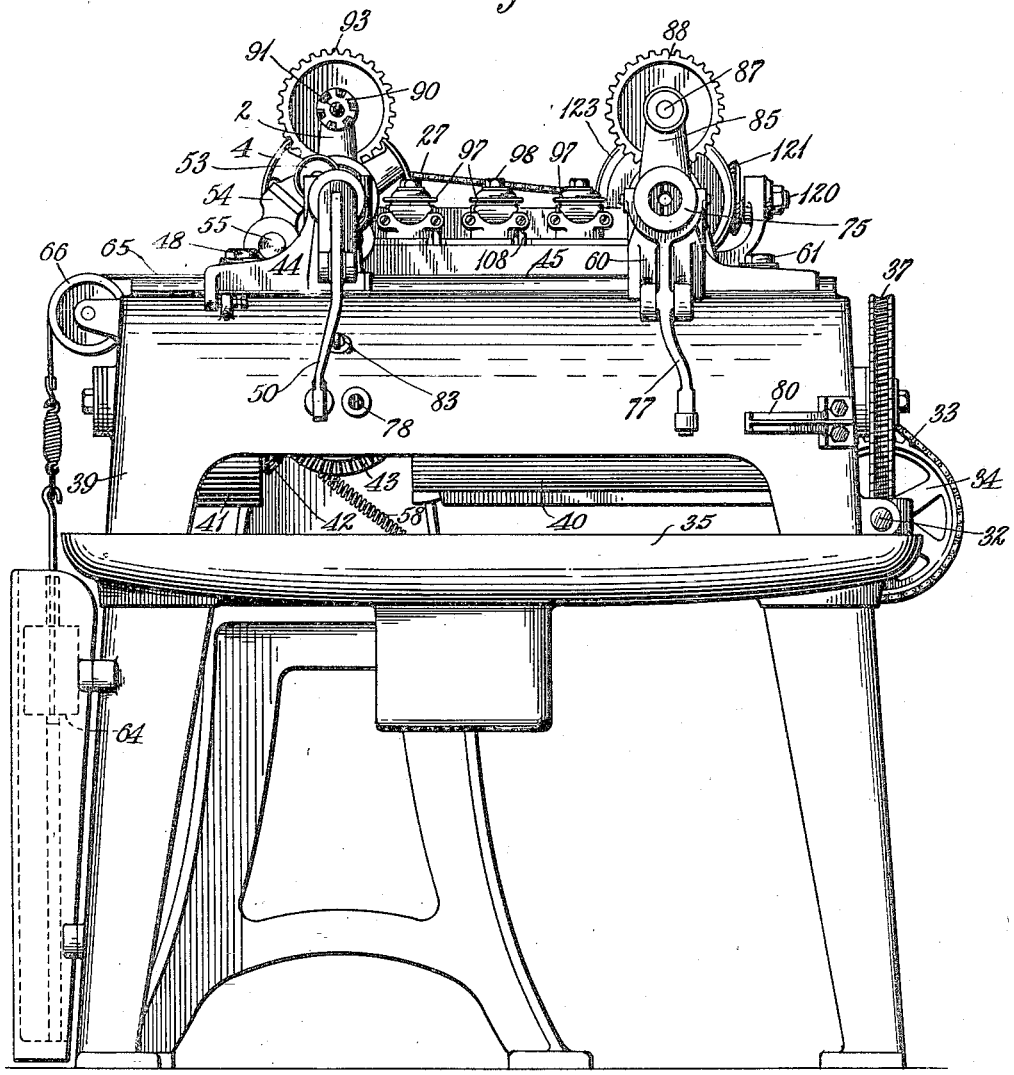
Figure 2:
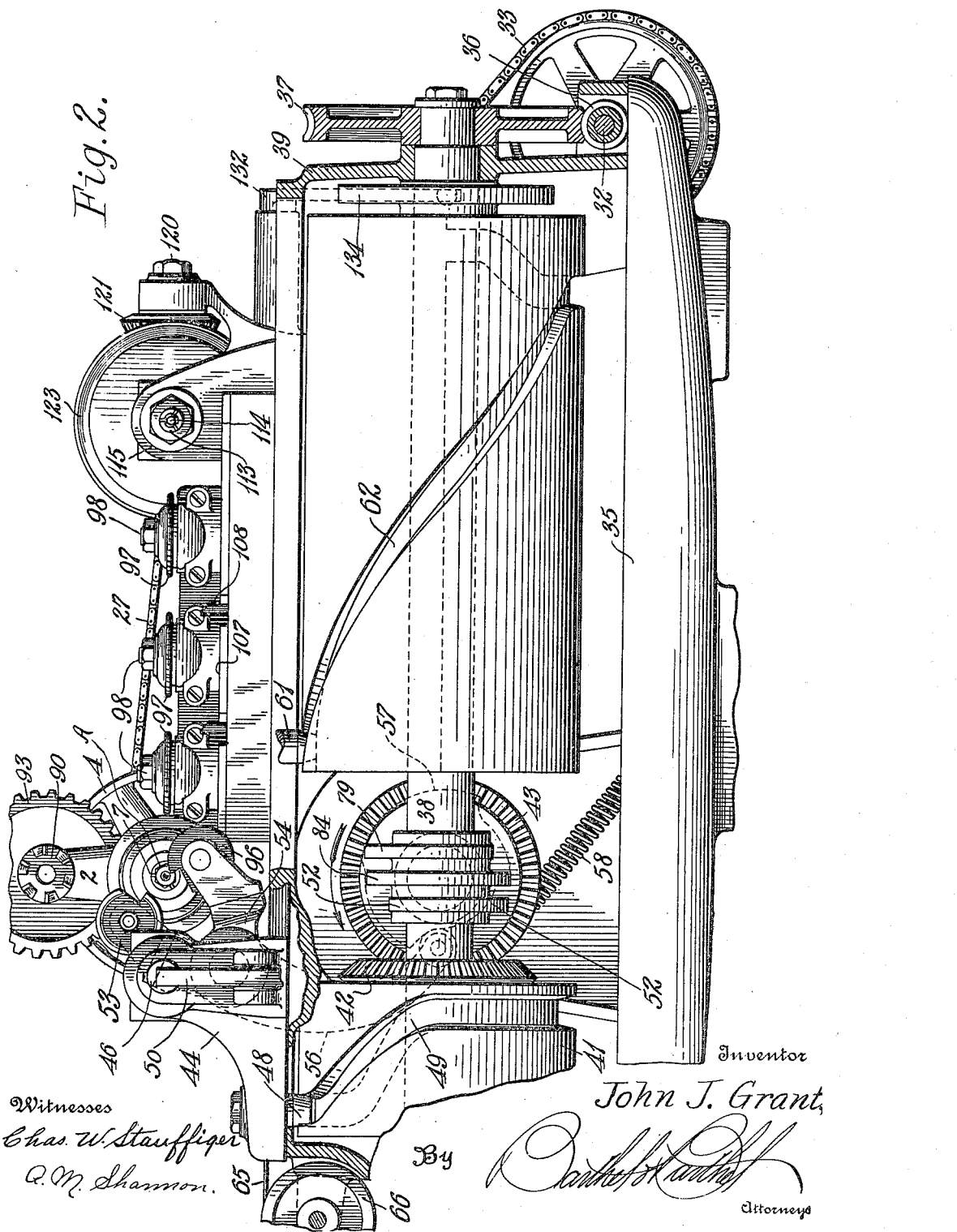
Figure 3:
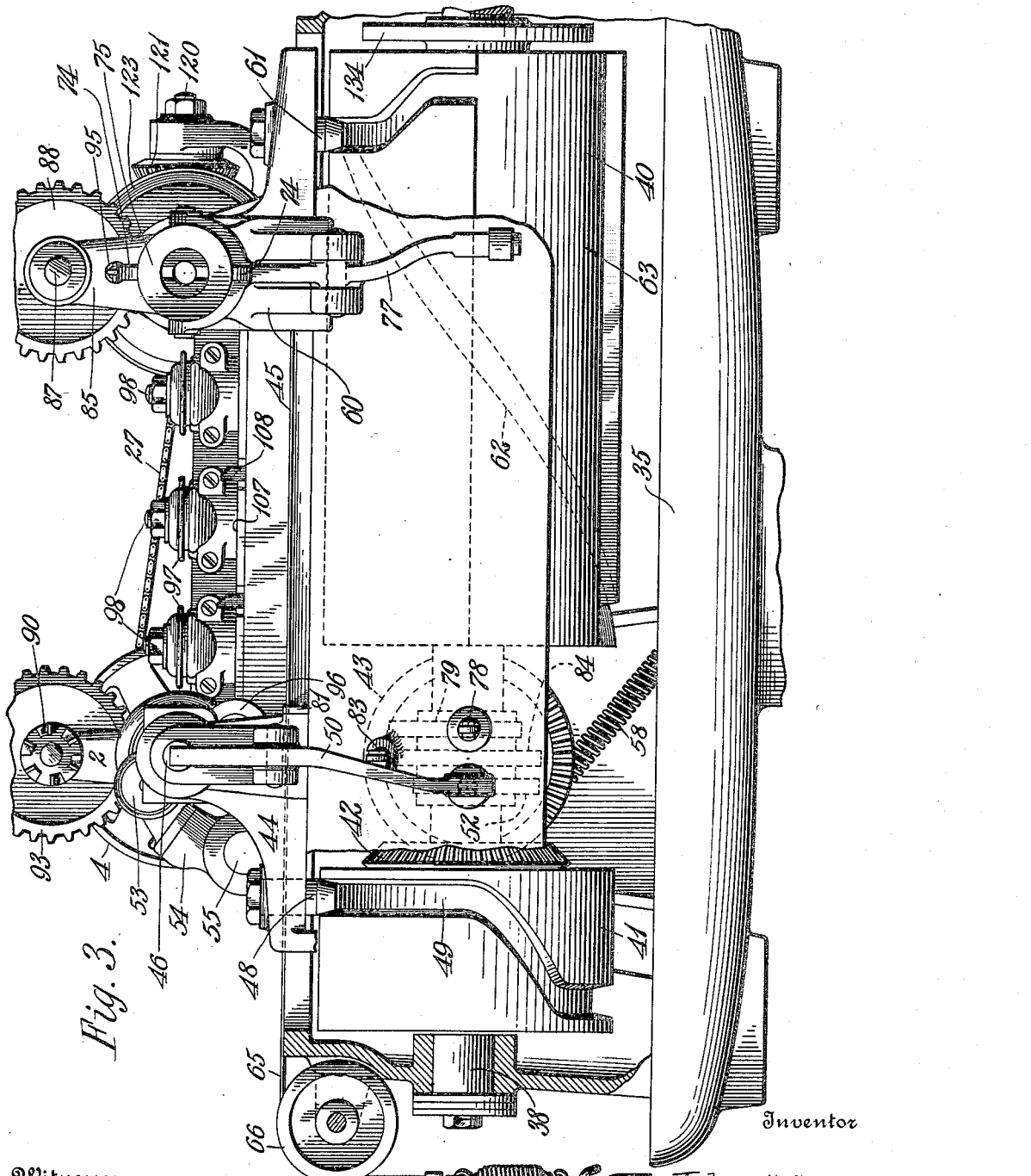
Figure 4:
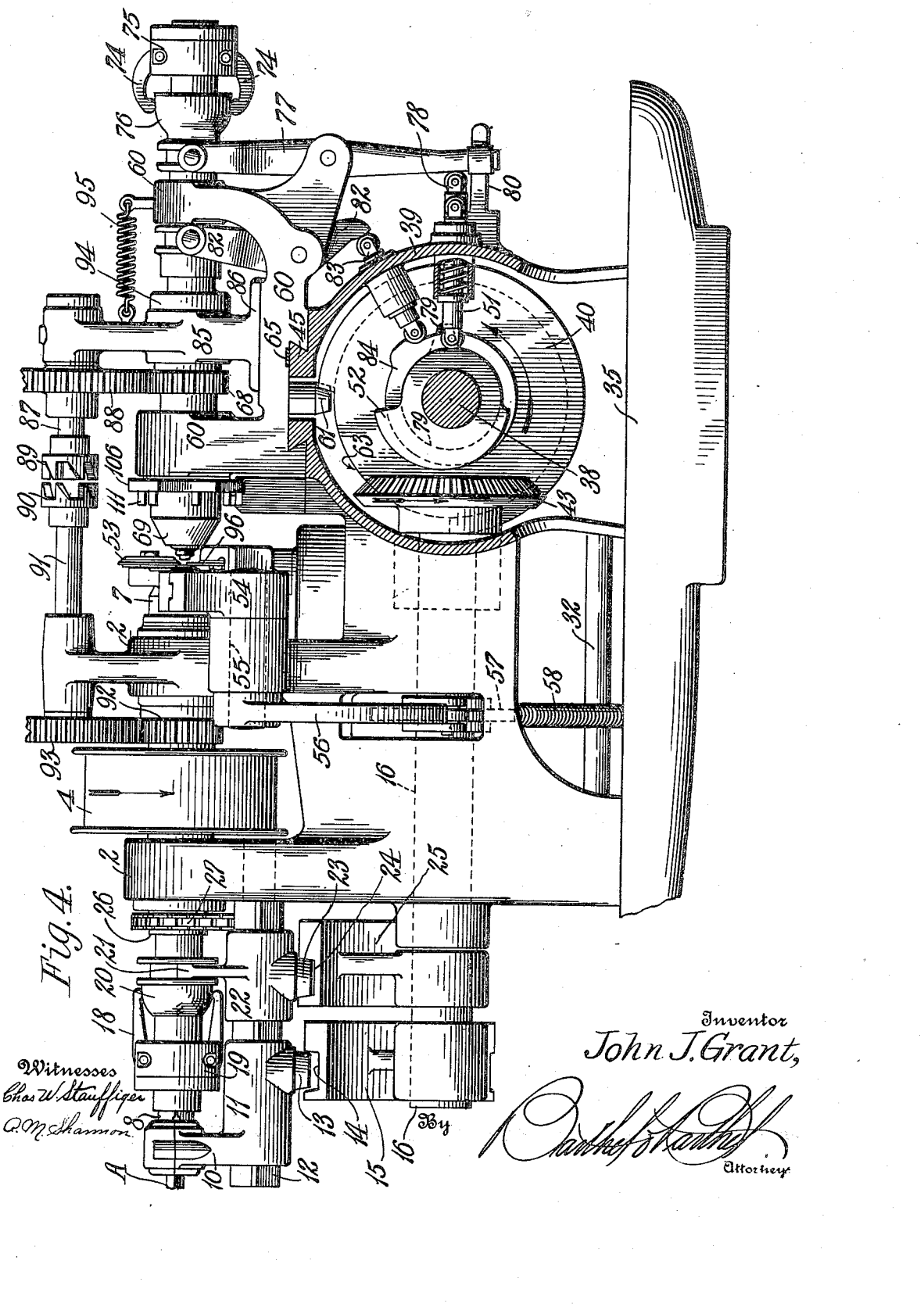
Figure 5:
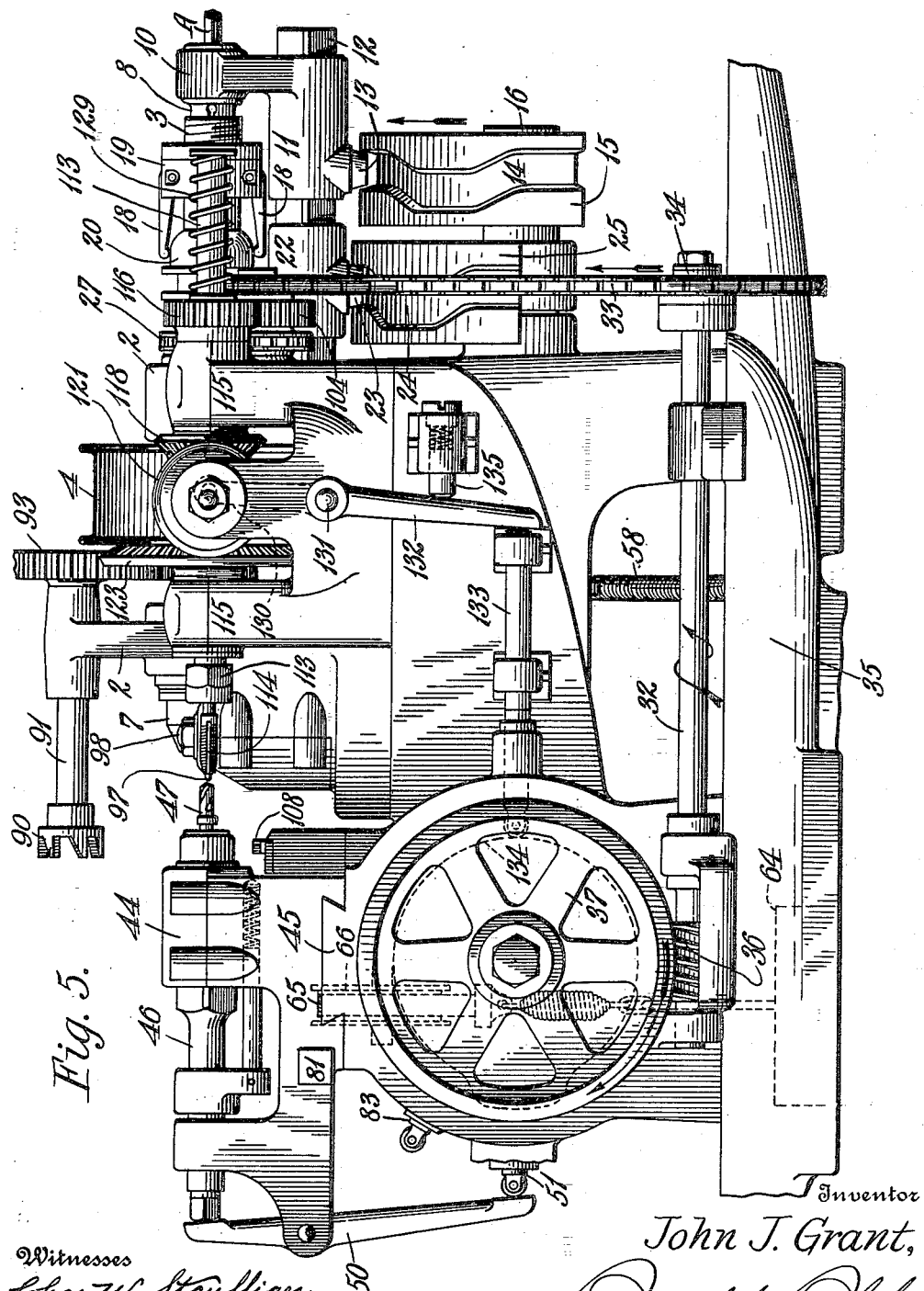
Figure 11:
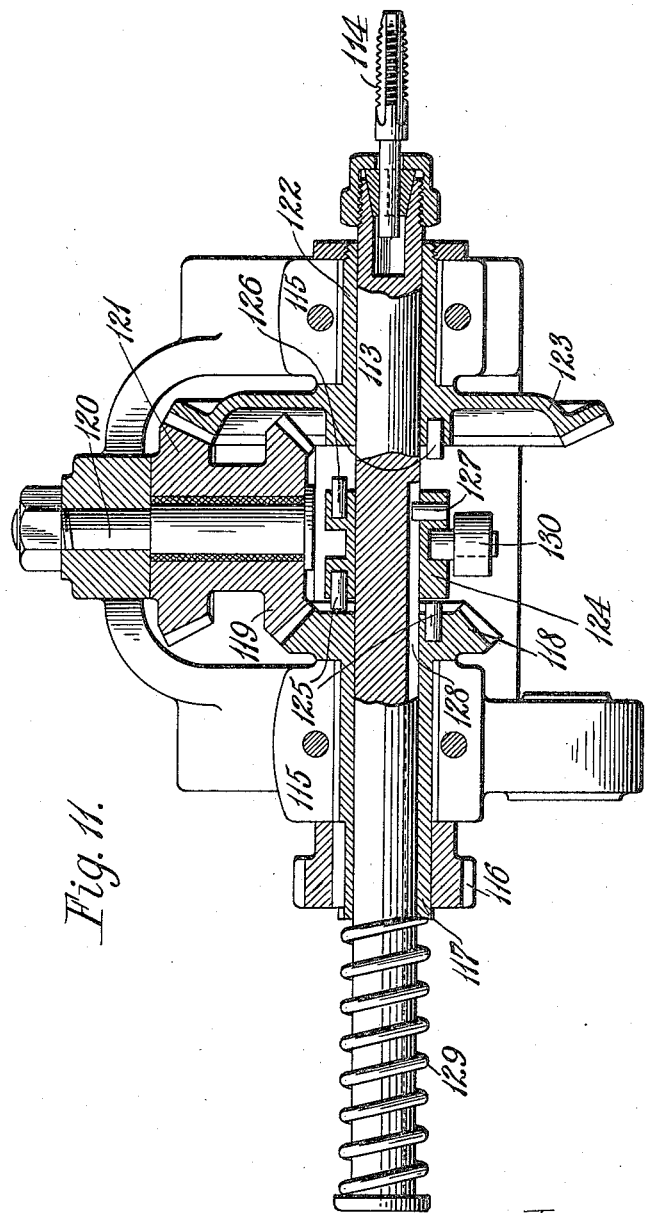

Figure 1 is a front elevation of a machine embodying the invention; Fig. 2 is a similar enlarged view with parts broken away to show the construction; Fig. 3 is a view similar to Fig. 2 showing the parts in another position and parts removed; Fig. 4, an end elevation with the drum casing in section and parts removed; Fig. 5, an elevation of the opposite end of the machine; Fig. 6 an elevation of the rear side of the machine; Figs. 7 and 8 together show a plan view, parts being broken away to show the construction; Fig. 9, is a sectional detail of a tubular traversing mandrel; Fig. 10 is a similar view of a chuck spindle; Fig. 11 is a sectional detail of a tap spindle and driving mechanism; Fig. 12, a detail of a track for guiding and turning the chuck head; Fig. 13, a plan view of the same; Fig. 14, a transverse section thereof, showing a portion of the chuck head; Fig. 15, is an end elevation of the chuck head; Fig. 16 is an enlarged detail showing a portion of the forming and cutting-off cutters with the adjacent end of the feed chuck and work in section; and Figs. 17 and 18 are a plane view and side elevation respectively, of a finished nut.

The stock from which the nuts B are made is in the form of a solid bar A having sides corresponding to the facets C of the nuts and this bar is carried, rotated and fed to the forming cutters by a tubular mandrel or feed spindle 1 mounted to rotate in suitable bearings on the frame or head-stock 2. This mandrel may be of any suitable construction but preferably comprises a tubular member 3 upon which a drive pulley 4 is secured and within this member is a thin sleeve 5 which is split inward from one end to form spring jaws 6 to engage and clamp the stock A near its inner end. The jaws have outer inclined surfaces to engage similarly formed internal faces on a conical head 7 secured to the end of the member 3 so that said jaws are forced inward to clamp the stock, by moving the sleeve longitudinally toward the head. A sleeve 8 projects into the end of the tube opposite that to which the head 7 is attached and this sleeve is formed with spring gripping fingers 9 to frictionally engage the stock, and feed the same longitudinally through the mandrel when the bar is released by the jaws 6.

To move the sleeve 8 and feed the stock in timed relation to the clamping of the same by the jaws 6, any suitable means may be provided, such as an arm 10 engaging the sleeve and formed integral with a sleeve 11 slidable longitudinally upon a guide bar 12 which is preferably formed rectangular in cross section, said sleeve being provided with a roll 13 to engage a cam groove 14 in a cam member 15 secured upon a rotatable shaft 16 mounted in bearings on the bed of the head-stock and driven in a manner hereinafter described. The sleeve 5 is moved longitudinally to clamp and firmly hold the stock, by slotting the end of the tube 3 and placing blocks 17 in these slots to engage the outer end of said sleeve, said blocks being engaged by the short arms of bell-crank levers 18 which are pivotally attached to a collar 19 adjustable upon the tube and operated by a wedge collar 20 moved longitudinally upon the tube by an arm 21 on a second sleeve 22 slidable upon the guide 12. This sleeve 22 is also provided with a roll 23 to engage a cam groove 24 in a cam member 25 on the shaft 16, and these cam grooves 14 and 24 are so formed and the members so arranged relative to each other that the sleeve 5 will be moved to release the bar before the sleeve 8 is moved to move the bar longitudinally and project its end through the head 7 the length of a nut. Further, the arrangement is such that the sleeve 8 will be moved in an opposite direction while the bar is held by the sleeve 5 so that its gripping fingers will slide upon the bar without moving it longitudinally, and thus the bar is intermittently fed forward and clamped in timed relation to the movements and operation of other parts of the machine.

Motion is transmitted from the mandrel or feed spindle 1 by a sprocket wheel 26 secured upon the tube 3 and engaged by a sprocket chain 27 running over a similar sprocket wheel 28 on a stud 29 which forms a journal therefor and for a smaller sprocket wheel 30 and gear 31 which are connected to the sprocket wheel 28 to turn therewith. From the wheel 30 slow motion is transmitted to a worm shaft 32 by a sprocket chain 33 running over a large sprocket wheel 34 on the end of said shaft which is mounted in bearings on the supporting frame or oil basin 35 at the end of the machine opposite that at which the feed spindle or mandrel 1 is located. On the forward end of the worm shaft 32 is secured a worm 36 in mesh with a large worm wheel 37 secured upon the end of a drum shaft 38 which extends at right angles to the worm shaft 32 across the front side of the machine within a suitable casing 39 for drums 40 and 41 mounted upon said shaft to turn therewith. These drums are spaced apart upon said shaft and mounted upon the shaft within this space is a bevel gear 42 meshing with a like gear 43 on the inner end of the cam shaft 16. A very slow motion is thus transmitted from the fast running feed mandrel to the drum shaft 38 and from said shaft to the cam shaft 16 to actuate the feed cams 15 and 25 in timed relation to the movements of the other parts of the machine which receive motion from said shaft.

To form the axial hole in the nut blanks after being fed forward and clamped in the feed mandrel, the stock or bar A is bored inward from its end which projects through the head 7, to a depth a little greater than the thickness of a nut, and to perform this drilling operation in timed relation to the feeding of the stock and the other operations of the machine, a tail stock 44 is mounted upon a dovetail guide track 45 formed upon the top of the drum casing 39 and extending the entire length thereof. This tail stock is provided with bearings for a dead spindle 46 carrying a drill 47 and it is moved to carry said drill into and out of axial alinement with the bar A in timed relation to the other movements of the machine, by a stud on the tail stock having a roll 48 engaging a cam groove 49 in the drum 41. When the tail stock has been moved to operative position with its drill in position for drilling the bar A, the dead spindle is moved longitudinally to feed the drill into the work, by a lever 50 pivoted intermediate its ends upon the tail stock and engaging the end of the spindle at its upper end and engaged at its lower end by a plunger 51, mounted in a suitable guide bearing in the casing 39, which plunger is actuated by a cam 52 on the drum shaft 38.

During the movement of the tail stock and the drilling operation, the end D of the nut blank is formed up by a suitable forming tool 53 which is secured upon the end of one arm of a forked lever 54 secured to a rock shaft 55 mounted in a suitable bearing upon the head stock 2, a downwardly extending lever or rocker arm 56 being secured to the opposite end of said shaft and provided with a roll upon its lower end to engage a cam 57 on the cam shaft 16. The arm is held turned with its roll in contact with said cam by means of a coiled spring 58 (see Fig. 6).

When the blank has been formed up upon the end of the bar A and the drilling operation has been completed by the movement of the tail stock into inoperative position as shown in Fig. 3, a suitable chuck spindle 59 is brought into alinement with the work. This chuck spindle is carried in bearings on a movable head stock or carriage 60 mounted to travel upon the guide track 45 and the head is positively moved away from the tail stock 44 by the engagement of a stud 61 on the head stock with a cam groove 62 in the cam drum 40. The end of this groove opens onto a cut-away portion 63 at one side of the drum so that when the stud runs out of the end of said groove, the head-stock may be quickly moved toward and into engagement with the tail-stock by a weight 64 attached to the end of a flexible steel strip or ribbon 65 secured to said head-stock and running beneath the tail stock and over a pulley 66 on the end of bed.

The chuck spindle 59 comprises a tubular member 67 mounted to turn freely and slide longitudinally in bearings on the movable head stock and is provided with a gear 68 by means of which it is rotated. Upon its inner end is secured a head 69 formed with a tapering bore which provides a seat for the jaws 70 of a tubular chuck member which is adapted to receive and grip the formed blank, said jaws being formed by splitting said tubular member inward from one end so that they will yield inwardly to grip the blank when the member is moved longitudinally to bring the jaws into contact with their tapering seat in the head. To thus move the tubular gripping member longitudinally, a tube 71 is provided within the member 67 to engage said gripping member at one end and to be engaged at its outer end by blocks 72 movable in slots 73 in the outer end of the member 67. These blocks are moved in the slots by means of levers 74 pivoted intermediate their ends to a block 75 adjustably attached to the outer end of the sleeve 67. To turn the levers upon their pivots with their short arms in engagement with the blocks 72 and thus move the blocks, a cam member 76 is mounted to slide freely upon said sleeve, and said cam member is moved in timed relation to the movements of the head stock and other parts of the machine, by a forked lever 77 which is pivoted intermediate its ends upon the head stock and is adapted to be engaged at its lower end by a plunger 78 mounted in a guide bearing on the drum casing 39 and engaged at its inner end by a cam 79 on the shaft 38 when the head stock is positioned with the chuck spindle in alinement with the work. At the opposite end of the travel of the head stock or carriage, said lever engages beneath an arm 80 on the drum casing having an inclined contact surface and is actuated thereby in an opposite direction to move the member 76 outwardly and permit the tube 71 and clamping member to move and allow the jaws to open for releasing the work.

After the chuck spindle has been brought into alinement with the work by the operation of the weight 64 which draws the head stock into contact with a bumper 81 on the tail stock, the whole spindle is moved longitudinally toward the work to enter the formed nut blank in the end of the chuck, by a forked lever 82 pivoted intermediate its ends upon the head-stock and engaged at its lower end by a plunger 83 movable in a bearing on the drum casing and engaged at its inner end by a cam 84 on the shaft 38.

A movable bracket 85 on the head-stock 60 has a foot or base 86 engaging a suitable guide-way extending longitudinally of the chuck spindle and transversely of the track 45. This bracket forms a bearing for the spindle and also a bearing for a stub shaft 87 which is provided with a gear 88 in mesh with the gear 68 on the chuck spindle. This shaft also has secured upon its inner end a toothed clutch member 89 to engage a like member 90 on the end of an alined shaft 91 supported in a bearing on the fixed head-stock of the machine and receiving motion from the feed mandrel 1 through gears 92 and 93. An adjustable collar 94 on the chuck spindle 59 abuts the bracket 85 and moves the same in the guide when the spindle is moved longitudinally by the lever 82 to bring its chuck over the formed blank on the end of the bar A and thus the clutch members 89 and 90 are brought into mesh simultaneously with the advancement of the spindle into chucking position and said spindle is immediately rotated thereby at the same speed as the mandrel so that the chuck jaws 70 may grip the nut blank which is still integral with the end of the bar A. Said jaws are formed to engage the sides of the blank and the teeth of said clutch members correspond in number to the number of said sides so that the clutch will be rotated in a position relative to the bar A to receive the blank formed thereon. A coiled spring 95 attached at one end to the bracket 85 and at its opposite end to a convenient part of the head-stock, acts to normally hold the clutch spindle in retracted position.

After the nut blank has been formed upon the end of the stock A by the cutter 53 and has been gripped by the chuck spindle, it is cut from the bar by a cutting tool 96 which is carried by the lower arm of the forked lever 54, the cam 57 being so formed as to turn said lever at the proper time and bring said cutting-off tool into engagement with the work.

Arranged in a row parallel with and at a distance to the rear of the track 45 for the traveling head-stock, are three horizontally disposed rotary cutters 97 secured upon vertical spindles 98 mounted in bearings upon the bed or frame of the machine and to the lower ends of which worm wheels 99 are secured in mesh with worms 100 on a horizontal shaft 101 which is driven by a stub shaft 102 through the worms 103. This stub shaft receives motion from the gear 93 on the mandrel 1 through an idler 104 and a gear 105 on the end of said stub shaft. These cutters are arranged in the horizontal plane of the axis of the nut blank and in the path of its travel as it is carried horizontally along the track 45 by the traveling head-stock after being severed from the bar A and serve to slot or castellate the formed end of the blank.

When the nut blank is brought into contact with the first of the rotary cutters, it is cut or grooved diametrically across at the center of two of its sides, and to turn it before it is brought opposite the second and third cutters so that it will be cut across at the centers of the other two sides, the chuck spindle 59 is provided with an index plate 106 adjacent to its head 69 and this plate is formed with six sides or faces corresponding to the six faces of the nut and as the movable head-stock carries the nut forward, one of these faces of the index plate engages and rides upon a track 107 which prevents the chuck spindle from turning and firmly holds the nut in position to be grooved by the first of the series of cutters. When this first cutter has finished its cut, the chuck spindle is turned to turn the nut blank one sixth of a revolution, by a dog 108 pivoted below the track and having an end normally held by means of a weighted lower end 109 on the dog, projected upward through an opening 110 in the track, within the path of pins 111 projecting laterally from the end face of the index plate. One of the pins on the index comes into contact with the first of the dogs 108 after the blank has been scored across by the first cutter and as the end of the slot 110 forms a stop to prevent the dog from turning in that direction, the index is forced to turn and the track upon which the index slides is formed with a slot 112 opposite the dog to permit the index to turn. The second dog engages the next pin on the index and turns the chuck spindle in a like manner before the nut blank is carried into engagement with the third cutter. The blank is thus scored diametrically across three times at the center of its six faces to form the castellated end of the nut.

After the head-stock 59 has carried the nut blank past the three rotary cutters, its stud 61 passes into a straight portion of the cam groove 62 and said head-stock is thus held stationary at this point for a portion of the revolution of the cam drum 40. A tap spindle 113 carrying a tap 114 is so positioned in suitable bearings 115 on the machine bed or frame that said tap will be in axial alinement with the nut blank when the same is held stationary by the engagement of said stud with the straight portion of the cam groove.

Motion is transmitted to the tap spindle from the gear 31 which is actuated from the mandrel by the sprocket chain 27, by a gear 116 secured upon the end of a sleeve 117 on the spindle, which sleeve is free to turn upon the spindle and is provided at its opposite end with a bevel gear 118 in mesh with a like gear 119 mounted to turn freely upon a stud bolt 120 and formed integral with a second bevel gear 121. A second sleeve 122 is mounted to turn freely upon the spindle and is provided with a large bevel gear 123 in mesh with the gear 121. Upon the spindle between the gears 123 and 118 is a clutch member 124 operatively connected to the spindle to turn therewith and free to move longitudinally thereon. This clutch member carries pins 125 and 126 projecting from its ends to engage corresponding pins on the gears 118 and 123 respectively. The clutch member 124 is connected to the spindle by a pin 127 or like means engaging a longitudinal slot 128 in the spindle, and this pin is so located relative to the end of the slot, that when said clutch member is moved toward the larger gear 123, said pin will come into engagement with the end of the slot and move the spindle longitudinally against the action of a coiled spring 129 sleeved on the rear end of the spindle between the end of the sleeve 117 and a head on the spindle, at approximately the same time that the pin 126 on the clutch member is brought into the path of the like pin on the gear 123. When said pins 126 come into engagement, a slow rotary motion is imparted to the spindle from the sleeve 117 through the reducing gears 119—121—123, thus giving the desired tapping speed to the tap. The initial forward movement given the spindle by the movement of the clutch member is for the purpose of entering the tap in the bore of the nut and starting the cut. When the tap begins to cut, it will feed itself into and through the blank.

To extract the tap from the blank after it has formed the internal thread of the nut, the rotation of the tap is reversed and is given a high speed to quickly withdraw it from the nut, by moving the clutch member 124 out of engagement with the gear 123 and into contact with the gear 118, bringing the pins 125 into engagement and driving the spindle in a reverse direction directly from said gear at the same speed at which the driving gear 116 is turned. This quickly withdraws the tap from the nut which is completed by this tapping operation and is ready to be discharged from the machine. The shifting of said clutch member 124 is automatically accomplished in timed relation to the movement of the head-stock 60 by a lever 130 connected to said member at its upper end and secured upon a rock-shaft 131 at its lower end, which shaft is mounted in a bearing on the machine bed and provided with an arm 132 projecting downward into the path of longitudinal movement of a plunger 133 movable in a suitable bearing in the side of the drum casing 39 and engaged at its opposite end, by a cam 134 on the drum shaft 38. The arm 132 is yieldingly held in contact with the end of the plunger by a spring pressed plunger 135 contacting its side opposite that in engagement with the plunger, and this spring plunger thus serves to move the clutch member 124 into engagement with the gear 118 and to hold the end of the plunger 133 in firm contact with its cam.

By the time the stud 61 on the movable head-stock has reached the end of the straight portion of the cam slot 62, the tapping operation has been completed and the tap has been withdrawn from the nut. The head-stock is then moved still farther toward the end of the drum to bring the nut out of alinement with the tap and to bring the end of the chuck operating lever 77 into engagement with the fixed arm 80 to move the cam member 76 and permit the chuck jaws 70 to spring open and release the finished nut.

To eject the finished nut from the chuck jaws when so released, an ejector tube 136, see Fig. 10, is placed within the tubular jaw member 70 and is formed with an end projecting outward between said jaws to near the outer end thereof where it is normally held by a coiled spring 137 sleeved upon its reduced inner end between a shoulder formed thereon by such reduction and the inner end of the tube 71. When the chuck spindle is moved bodily to bring the chuck jaws over the formed blank on the end of the stock, as previously described, said blank enters the jaws and presses the ejector inwardly against the action of the light spring 137 and thus when the nut is finished and the jaws are opened, as described, this spring will act to move the ejector 136 longitudinally and push the finished nut from between the chuck jaws so that it will drop from the machine before the movable head-stock is returned to position in front of the feed mandrel to receive a second blank.

In operating the machine, a stock bar A of the desired size and form is inserted in the feed mandrel 1 where it is caught by the gripping fingers 9 which are operated by the cam 15 to feed the bar into the machine with a step by step movement as the blanks are formed up and cut from the inner end of the bar. The cam 25 operates in timed relation to the cam 15 to actuate the chuck jaws 6 and firmly clamp the bar after it has been moved inward by the fingers 9 the length of a nut blank and release said bar after the blank has been formed by the cutter 53, bored by the drill 47, chucked by the chuck spindle 59, and cut off by the cutter 96. During the feeding of the stock and the chucking of the same by the jaws 6, the tail stock 44 is moved into alinement with the mandrel by its cam drum 41 and while its stud 48 is in the straight portion of the cam groove of said drum, the cam 52 operates to project the drill 47 and bore the end of the stock. The cam 57 also operates as soon as the stock is chucked, to bring the forming tool 53 into engagement with the stock. Immediately upon the finishing of the drilling operation and the movement of the tail stock out of operative position, the movable head-stock is brought into alinement with the mandrel by the weight and the chuck spindle shifting cam 84 operates to move said spindle 59 and bring the jaws 70 in position to clamp the formed blank which is still integral with the end of the bar, the chuck cam 79 operating immediately thereafter to close the jaws 70 and clamp the blank. As soon as the blank is firmly held by the chuck spindle, the cam 57 again operates to bring the cutting-off tool 96 into operation to sever the blank from the bar and then swings said tool and the tool 53 to mid position where they are held by the cam during the feeding forward and chucking of the bar for a second operation. Immediately upon the severance of the blank, the drum cam 40 operates to move the head-stock 60 along its track 45 to carry the blank past the three rotary cutters 97 for castellating its end, and during this forward movement of said head-stock, the cam drum 41 operates to again move the tail stock into alinement with the mandrel for boring the second blank. When the stud 61 reaches the straight portion of the cam groove 62, the head stock stands still during the tapping operation, as previously described, and is moved to discharge position by an offset in said groove as soon as the tapping is finished when it is again held stationary for a short period by another straight run in said groove during the ejection of the finished nut by the ejector 136. Said stud then runs out of the end of its cam groove where said groove opens into the cut-away side 63 of the drum and the head-stock is thus free and will be quickly moved along its track by the weight 64 into contact with the stop of bumper 81 on the tail stock into position to chuck the second blank which has just been bored by the drill on said tail stock.

All of the cams for the feeding, boring, chucking, castellating, tapping, and discharging operations are mounted upon the shaft 38 and shaft 16 which is driven by the shaft 38, and thus the movements are all accurately timed in relation to each other and accuracy of operation insured. The stock is accurately fed and rigidly held by the feed mandrel and accuracy of forming and boring the blank thus insured. Inaccuracies in chucking the blank are obviated by driving the chuck spindle from the mandrel through the countershaft formed by the shafts 87 and 91 and connecting clutch members 89 and 90, and accuracy in the castellating operation is insured by the index 106 and its track 107 which firmly hold the blank in relation to the rotary cutters.

The particular arrangement and combination of parts gives a simple and compact machine which will operate to automatically and accurately form castellated nuts but it will be understood that I do not limit myself to the particular construction, arrangement and combination shown, as changes may obviously be made without departing from the spirit of my invention, except as required for the claims.

Having thus particularly described my invention what I claim is:—

1. In a nut castellating machine, the combination of movable means for rotatively holding a nut blank, means for forming and boring the nut blank, a series of alined cutters for scoring the blank diametrically across one end, means for moving the holding means past the cutters, and means for turning said holding means between adjacent cutters to present the blank to each cutter in a different position, said means also serving to hold the holding means against turning during its travel past each cutter and while the blank is being scored thereby.

2. In a nut castellating machine, the combination of movable means for rotatively holding a nut blank, means for forming and boring the nut blank, a series of alined cutters for scoring the blank diametrically across one end, means for moving the holding means past the cutters, a member rotatable with said holding means and having sides corresponding to the facets of the blank, means to engage the sides of said member for preventing the turning of the holding means, and means for turning said member.

3. In a nut castellating machine, the combination of movable means for rotatively holding a nut blank, means for simultaneously forming and boring the blank, a series of alined cutters for scoring the blank diametrically across one end, means for moving the holding means past the cutters, a member carried by and rotatable with said holding means and having sides corresponding to the facets of the blank, a track adapted to be engaged by the sides of said member as the holding means moves past said cutters, means for turning said member to turn the blank holding means, and means operated in timed relation to said holding means for tapping each blank.

4. In a machine of the character described, the combination of means for holding and rotating a formed bar, a cutter movable toward and from the bar to form and cut nut blanks therefrom, means for moving the cutter, means for intermittently moving the bar longitudinally in timed relation to the movement of the cutter, means movable into and out of longitudinal alinement with the bar to receive and hold the nut blanks severed therefrom, means for moving the holding means in timed relation to the movement of the cutter, and a series of cutters in the path of movement of the holding means to score transversely the blank held thereby.

5. In a machine of the character described, the combination of a member for holding and rotating a stock bar adapted to be cut into nut blanks, a movable cutter for forming and cutting nut blanks from the bar, a rotatable member adapted to receive and hold the nut blanks, means for transmitting motion from the means for holding and rotating the bar to the member for receiving and holding the nut blank, said means comprising engaging and disengaging means adapted to be brought into engagement by a movement of the holding member toward the end of the bar, means for moving the holding member into and out of alinement with the bar, and means for moving the holding member toward the bar when in alinement therewith.

6. In a machine of the character described, the combination of a traversing mandrel for holding and feeding a stock bar, cutters for forming a nut blank upon the end of the bar and cutting it therefrom, a chuck to receive and hold the blanks, a tail stock, a drill carried by the tail stock, means for moving the chuck and tail stock into and out of axial alinement with said mandrel in timed relation to each other, and a cutter for castellating the blank positioned in the path of the blank when carried away from the stock bar by the movement of the chuck.

7. In a machine of the character described, the combination of a traversing mandrel for holding and feeding a stock bar, cutters for forming a nut blank upon the end of the bar and cutting it therefrom, means for rotating the traversing mandrel, a chuck movable toward and from the end of the bar to receive and hold nut blanks cut therefrom, and means for transmitting motion from the mandrel to actuate the chuck in unison therewith.

8. In a machine of the character described, the combination of a traversing mandrel for holding and feeding a stock bar, cutters for forming nut blanks and cutting the same from the end of said bar, means for rotating the mandrel, means for receiving and holding the nut blanks, means for moving said receiving means into alinement with said mandrel and toward the end of the bar to engage said means therewith, and means for transmitting motion from said means for rotating the mandrel to rotate said receiving means, said motion transmitting means embodying engaging and disengaging members adapted to be brought into engagement by the movement of said receiving means toward the end of the bar.

9. In a machine of the character described, the combination of means for holding a stock bar and rotating and moving the same longitudinally, cutters for forming and severing nut blanks from said bar, means for actuating the cutters in timed relation to the longitudinal movement of the bar, means movable into and out of alinement with said bar transversely thereof for boring the bar longitudinally, means for receiving and holding nut blanks severed from the end of the bar and movable into and out of alinement with said bar transversely thereof, a cutter disposed in the path of movement of a nut blank for scoring the blank transversely while being moved laterally by the holding means, and means for actuating the holding means for the bar, the boring means and the receiving means for the nut blanks in timed relation to each other.

10. In a machine of the character described, the combination of a traversing mandrel for holding, intermittently feeding and rotating a stock bar, cutters for forming and cutting nut blanks from the end of said bar, a tail stock movable transversely of the longitudinal axis of the mandrel, boring means carried by said tail stock, a carriage movable transversely of the longitudinal axis of the mandrel in the plane of movement of the tail stock, means on said carriage for receiving and holding nut blanks, means actuated in timed relation to the actuation of said mandrel for moving said tail stock and carriage relatively in timed relation into and out of axial alinement with the mandrel, and a horizontally disposed cutter for scoring each blank transversely while held by the means on the carriage and moved by said carriage.

11. In a machine of the character described, the combination of a traversing mandrel for holding and feeding a stock bar, cutters for forming and cutting nut blanks from said bar, a tail stock, means for boring the bar longitudinally carried by the tail stock, a carriage, means on the carriage for receiving and holding the nut blanks, a track upon which said tail stock and carriage are movable, said track being arranged transversely of the longitudinal axis of said mandrel, means for moving said tail stock and carriage along said track in timed relation to each other, and a series of cutters arranged in the path of movement of nuts carried by said carriage for castellating the blanks.

12. In a machine of the character described, the combination of a traversing mandrel for holding and feeding a stock bar, cutters for forming and severing nut blanks from said bar, a tail stock, means on the tail stock for boring the bar longitudinally, a carriage, a chuck on the carriage, a horizontally disposed track arranged at right angles to the longitudinal axis of said mandrel, means for moving said tail stock and carriage along said track in timed relation to each other, a series of cutters in the path of movement of nut blanks held by the chuck upon the carriage, and tapping means arranged at right angles to the path of movement of the carriage along said track and into alinement with which the nut blanks are carried by said carriage.

13. In a machine of the character described, the combination of a mandrel for holding a stock bar, cutters for forming and severing nut blanks from the end of said bar, a horizontally disposed track, a tail stock movable along said track into and out of longitudinal alinement with said mandrel and adapted to hold nut blanks, a carriage movable along said track into and out of longitudinal alinement with said mandrel, means beneath the track for moving said tail stock and carriage in timed relation to each other, and means for scoring blanks held by said tail stock.

14. In a machine of the character described, the combination of a mandrel for holding a stock bar, means for gripping and intermittently feeding said bar longitudinally, cutters movable toward and from said bar adjacent to its end, means for actuating the feeding means, and moving the cutters in timed relation to each other, a chuck to receive and hold nut blanks, a carriage for said chuck reciprocable at right angles to said feeding means to move the chuck into and out of alinement with said bar, a chuck on the carriage, means for reciprocating the carriage in timed relation to the actuation of said feeding means and cutters, a horizontally disposed cutter arranged in the path of travel of nut blanks held by said chuck and carried by said carriage for scoring the blanks diametrically across one end.

15. In a machine of the character described, the combination of a traversing mandrel for holding and feeding a stock bar, means for actuating said mandrel, cutters for forming and severing nut blanks from said bar, a horizontally disposed track arranged at right angles to the longitudinal axis of said mandrel, a tail stock movable along said track, boring means on said tail stock for boring said bar longitudinally, a carriage movable along said track, a chuck on the carriage for holding nut blanks, a series of cutters arranged in the path of travel of nut blanks, carried by said chuck to castellate the blanks, means for imparting to said tail stock and carriage an intermittent travel along said track in timed relation to each other, said means embodying means for stopping and holding said tail stock and carriage with said boring means and chuck in axial alinement with said mandrel.

16. In a machine of the character described, the combination with means for holding and feeding a stock bar, and cutters for forming and severing nut blanks from said bar, of a series of cutters for castellating said blanks, a chuck to receive each nut blank as it is severed from the bar and hold the same, and means for moving said chuck past the several cutters to bring the blanks into engagement therewith and for turning the chuck between adjacent cutters to present the blank to each cutter in a different position.

17. In a machine of the character described, the combination with means for holding and feeding a stock bar, and cutters for forming and severing nut blanks from said bar, of a horizontally disposed track, a series of cutters adjacent to said track, a member movable along said track and provided with means for receiving a nut blank and holding the same during the travel of said member to bring the blank into contact with the series of cutters, and means for holding said member with its blank holding means in alinement with the end of said bar and advancing the same along said track past the series of cutters, said means being arranged to permit a quick return of said member to position opposite the end of said bar.

18. In a machine of the character described, the combination with means for holding and feeding a stock bar, and cutters for forming and severing nut blanks from said bar, of a horizontally disposed track, a series of cutters arranged adjacent to said track, a carriage movable along said track, a chuck on the carriage for receiving a nut blank, means for rotating said chuck to turn the blank between adjacent cutters, a rotatable drum beneath the track having a cam groove, means on the carriage to engage said groove, said drum having a cutaway side to permit a quick movement of the carriage in one direction independently of the turning of the drum, means for moving the carriage independently of the drum, and means for turning the drum.

19. In a machine of the character described, the combination with means for holding and feeding a stock bar, and cutters for forming and severing nut blanks from said bar, of a horizontally disposed track, a series of cutters arranged along said track, a carriage movable along said track, a chuck on the carriage to receive nut blanks, power actuated means for positively moving said carriage in one direction to carry the nut blank past the cutters in engagement therewith, said means being adapted to release said carriage at the end of its movement, and separate means adapted to quickly return said carriage to the opposite end of its movement upon its release by said power means.

20. In a machine of the character described, the combination of a traversing mandrel for holding and feeding a stock bar, cutters for forming and severing nut blanks from the end of said bar, a track extending at right angles to the longitudinal axis of said mandrel, a tail stock movable along said track, boring means on said tail stock, a carriage movable along said track into and out of alinement with said mandrel, a rotatable chuck on said carriage to engage the nut blanks before they are severed from said bar and to hold and carry the same after severance, means embodying connecting and disconnecting members for transmitting motion from said mandrel to said chuck when said carriage is in alinement with the mandrel, and cams for moving said tail stock and carriage along said track in timed relation to each other and to the actuation of the mandrel.

21. In a machine of the character described, the combination of a traversing mandrel for holding and feeding a stock bar, cutters for forming and severing nut blanks from the end of said bar, a horizontally disposed track extending at right angles to the longitudinal axis of said mandrel, a tail stock movable along said track, boring means on the tail stock movable longitudinally into engagement with the end of said bar to bore the same axially, means for moving the tail stock upon the track, means operating in timed relation to the movement of the tail stock to advance the boring means when the same is brought into alinement with the bar by the movement of the tail stock, a carriage movable along said track, means for moving said carriage along the track in timed relation to the movement of the tail stock, a chuck on said carriage movable longitudinally into engagement with the end of said bar to grip the same and hold the nut blank when severed from the bar, means for moving said chuck into engagement with the bar in timed relation to the movement of the carriage, means for transmitting a rotary motion to said chuck for turning the same in unison with said bar and comprising connecting and disconnecting means adapted to be brought into connection by the movement of said chuck toward the bar, and a series of cutters for castellating the nut blanks arranged in the path of travel of said blank as it is carried along said track by said carriage.

22. In a nut forming machine, the combination of a head stock having bearings, a tubular member rotatively mounted in said bearings, a sleeve within said member adapted to be moved longitudinally therein and to receive a stock bar, means for gripping said bar carried by said member and sleeve and operated by a longitudinal movement of said sleeve, a gripper through which said bar extends and which is movable longitudinally thereon, means for moving the sleeve and gripper longitudinally in timed relation to each other to feed the bar longitudinally and clamp the same against longitudinal movement, means for rotating said tubular member to turn the bar, cutters for forming and severing nut blanks from the projecting end of said bar adjacent to the end of said sleeve, means for moving the cutters into and out of contact with the bar in timed relation to the operation of the means for moving said sleeve and gripper relatively, carrying means including means for receiving and holding the nut blanks movable in timed relation to the movement of said sleeve and gripper, and means for scoring the blanks positioned in the path of movement of the blanks when carried by the carrying means.

23. In a nut forming machine, the combination of a traversing mandrel adapted to hold and feed a stock bar with a step by step movement, cutters for forming and severing nut blanks from the end of said bar, a carriage movable into and out of alinement with said mandrel, a rotatable tubular member mounted on said carriage and adapted to be moved longitudinally in its bearings, means for moving the carriage, an inner longitudinally movable member in the tubular member, jaws for receiving and gripping a nut blank and adapted to be actuated to close the same by a longitudinal movement of said inner member, means for moving the rotatable tubular member and inner member relatively in a longitudinal direction and in timed relation to each other to advance said jaws toward a nut blank on the end of the bar and then close said jaws upon the blank, and a spring pressed ejector member within said tubular member adapted to be depressed by the insertion of a nut blank between said jaws and to automatically operate to eject said blank when the jaws are opened.

24. In a nut castellating machine, the combination of a traversing spindle adapted to hold a stock bar, means for rotating said spindle, means for intermittently feeding the bar longitudinally, cutters for forming and severing nut blanks from said bar, means for actuating said cutters in timed relation to the feeding means to move them into and out of engagement with said bar, boring means movable into and out of alinement with the longitudinal axis of said bar, a chuck to receive and hold nut blanks movable into and out of longitudinal alinement with the axis of said bar, means for moving the boring means and chuck in timed relation to each other and to the actuation of the feeding means, means for transmitting rotary motion from said mandrel to turn the chuck in unison therewith, a series of horizontally disposed cutters arranged in the path of movement of the nut blanks carried by said chuck, means for rotating said chuck between adjacent cutters, tapping means into longitudinal alinement with which the nut blanks are brought by the carrying movement of the chuck, means operating in timed relation to the carrying movement of said chuck to advance said tapping means and engage the same with the blank, and means for turning said tapping means.

25. In a nut castellating machine, the combination of a traversing mandrel, cutters operating in timed relation to said mandrel to form and sever nut blanks, a track extending at right angles to the longitudinal axis of said mandrel, a carriage movable along said track, rotatable holding means on said carriage carried into and out of alinement with said mandrel by the carriage, a series of cutters and tapping means arranged along said track in the path of a nut blank carried by said holding means, indexing means rotatable with said holding means, and means engaging said indexing means during the travel of the blank in engagement with each cutter and while opposite said tapping means to prevent the turning of said holding means.

26. In a nut castellating machine, the combination of a traversing mandrel, cutters operating adjacent to one end of said mandrel to form and sever nut blanks from stock held by said mandrel, means to receive and hold each nut movable into and out of alinement with said mandrel, a series of cutters for castellating nut blanks arranged in the path of blanks held and carried by said receiving means, a tap spindle for holding a tapping tool into alinement with which the nut blanks are brought by the movement of the receiving means, and means for advancing and rotating said spindle comprising change speed gearing and shifting means therefor.

27. In a nut castellating machine, the combination of a traversing mandrel, cutters adjacent to one end of said mandrel for forming and severing nut blanks from the end of a stock bar having a plurality of faces held by the mandrel, a horizontally movable carriage, a rotatable chuck on said carriage adapted to receive and hold the nut blanks, a series of horizontally disposed cutters arranged in the path of travel of nut blanks carried by said chuck, a track extending along the path of travel of said carriage, an indexing plate rotatable with said chuck and having edge faces corresponding to the facets of the nut blanks, said plate adapted to be moved along said track with one of its faces in contact therewith to prevent the turning of the chuck, said track being cut away adjacent to each cutter to permit the turning of said plate and chuck between adjacent cutters, means adjacent to each cut-away portion of the track to turn the said plate and bring its adjacent edge face into contact with the track, and means for moving the carriage.

28. In a nut castellating machine, the combination of a traversing mandrel, cutters adjacent to one end of said mandrel for forming and severing nut blanks from the end of a stock bar having a plurality of faces held by the mandrel, a horizontally movable carriage, a rotatable chuck on said carriage adapted to receive and hold the nut blanks, a series of horizontally disposed cutters arranged in the path of travel of nut blanks carried by said chuck, a track extending along the path of travel of said carriage, an indexing plate carried by the chuck and having edge faces corresponding to the facets of the nut blanks with one of said faces in contact with said track to hold the chuck from turning, said track having portions cut away adjacent to said cutters to permit the turning of said plate, pins on the plate, gravity dogs adjacent to the cut away portions of the track to engage said pins and turn the plate and chuck between adjacent cutters during the movement of said carriage in one direction, and means for moving said carriage.

29. In a nut castellating machine, the combination of a rotatable hollow mandrel adapted to hold and rotate a stock bar having faces to correspond with the desired facets of nuts to be formed from said bar, means intermittently moving the bar longitudinally through the mandrel, means for rotating the mandrel, cutters adjacent to one end of the mandrel for forming and severing nut blanks from the end of the bar, a tail stock movable transversely of the longitudinal axis of said mandrel into and out of alinement with the same, boring means on the tail stock movable longitudinally of the longitudinal axis of said mandrel, a carriage movable transversely of the longitudinal axis of said mandrel into and out of alinement with the mandrel, a rotatable chuck mounted on said carriage and adapted to be moved longitudinally of the longitudinal axis of said mandrel, a common track for said tail stock and carriage, a series of cutters arranged adjacent to said track in the path of travel of a nut blank carried by said chuck and carriage, a drum extending longitudinally of the track and provided with a cam slot and a cut-away portion into which the slot opens, means on the carriage to engage the cam slot and move the carriage in one direction, means for imparting a quick return movement of the carriage when said means on the carriage runs out of the cam slot into the cut-away portion of the drum, a cam member in axial alinement with said drum for moving the tail stock along said track in timed relation to the movement of the carriage, and means for turning the cam member and drum in timed relation to the movement of the means for intermittently moving the stock bar.

In testimony whereof I affix my signature in presence of two witnesses.

JOHN J. GRANT.

Witnesses:
C. R. STICKNEY,
OTTO F. BARTHEL.